(12) United States Patent
Chari

(10) Patent No.: US 9,386,267 B1
(45) Date of Patent: Jul. 5, 2016

(54) COOPERATIVE TRANSCODING TO MULTIPLE STREAMS

(75) Inventor: Santhana Chari, Mableton, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 728 days.

(21) Appl. No.: 13/372,995

(22) Filed: Feb. 14, 2012

(51) Int. Cl.
*H04N 7/26* (2006.01)
*H04N 7/14* (2006.01)

(52) U.S. Cl.
CPC .................................. *H04N 7/14* (2013.01)

(58) Field of Classification Search
CPC ........... H04N 7/26; H04N 7/32; H04N 11/02; H04N 7/40; H04N 7/14; H04N 7/12; H04B 1/66; G06F 15/16
USPC ............. 375/240.01, 240.07, 240.12, 240.16, 375/E07.126, 240.02, 240.13; 382/232, 382/236; 709/231; 725/62
See application file for complete search history.

(56) References Cited

U.S. PATENT DOCUMENTS

| | | | |
|---|---|---|---|
| 5,600,646 A * | 2/1997 | Polomski | 370/263 |
| 6,434,197 B1 * | 8/2002 | Wang | H04N 21/23655 375/240.03 |
| 6,466,623 B1 * | 10/2002 | Youn | H04N 19/51 375/240.16 |
| 6,501,797 B1 * | 12/2002 | van der Schaar et al. | 375/240.12 |
| 6,904,094 B1 * | 6/2005 | Liu | H04N 19/61 375/240.13 |
| 6,925,501 B2 * | 8/2005 | Wang et al. | 709/231 |
| 7,675,972 B1 * | 3/2010 | Laksono | H04N 19/52 375/240.12 |
| 7,692,683 B2 * | 4/2010 | Kenoyer | H04N 7/152 348/14.08 |
| 7,792,679 B2 * | 9/2010 | Virette | G10L 19/002 370/254 |
| 8,576,858 B2 * | 11/2013 | Kimmich | H04N 21/631 370/401 |
| 2006/0087553 A1 * | 4/2006 | Kenoyer et al. | 348/14.08 |
| 2007/0030902 A1 * | 2/2007 | Winger et al. | 375/240.16 |
| 2007/0074266 A1 * | 3/2007 | Raveendran et al. | 725/135 |
| 2007/0076794 A1 * | 4/2007 | Yatabe et al. | 375/240.13 |
| 2009/0060032 A1 * | 3/2009 | Schmit et al. | 375/240.01 |
| 2009/0256863 A1 * | 10/2009 | Komorowski et al. | 345/660 |
| 2010/0046612 A1 * | 2/2010 | Sun | H04N 19/149 375/240.02 |
| 2010/0260259 A1 * | 10/2010 | Kimmich et al. | 375/240.07 |
| 2012/0002728 A1 * | 1/2012 | Eleftheriadis et al. | 375/240.16 |
| 2013/0044803 A1 * | 2/2013 | Fisher et al. | 375/240.02 |
| 2014/0047486 A1 * | 2/2014 | Gordon et al. | 725/62 |

OTHER PUBLICATIONS

"Architectures for Fast Transcoding of H.264/AVC to Quality-Scalable SVC Streams" by Jan de Cock et al., (hereinafter Jan) vol. 11, No. 7 Nov. 2009; 1520-9210 © 2009 IEEE.*

* cited by examiner

*Primary Examiner* — Dave Czekaj
*Assistant Examiner* — Dramos I Kalapodas
(74) *Attorney, Agent, or Firm* — Troy Van Aacken

(57) ABSTRACT

This disclosure describes cooperatively transcoding an input signal to one or more output signals. The software and/or hardware logic modules are designed to work cooperatively in ways that can reduce the number and/or complexity of logic modules implementing a plurality of related transcodings of signal formats. By advantageously determining dependencies and sub-functions in transcoding an input stream to multiple output streams, hardware and/or software logic can be reduced. Reduced logic to implement multi-format transcoding improves the costs and/or capacity of systems for transcoding large numbers of streams and signals.

15 Claims, 2 Drawing Sheets

FIG. 1 – PRIOR ART

COOPERATIVE TRANSCODING TO MULTIPLE STREAMS

TECHNICAL FIELD

This disclosure relates to cooperatively transcoding an incoming media stream to multiple output streams.

BACKGROUND

Consumers have an ever greater choice of end-user network-access playback devices that are capable of playing content including but not limited to text, images, audio, two-dimensional (2D) video, and now even three-dimensional (3D) video. These end-user network-access devices or network terminals receive content over an increasing variety of network access technologies over both constrained-media (including, for example, electrical conductors, fiber optics, and waveguides, among others, and combinations thereof) and unconstrained-media (such as, for example, but not limited to: mobile wireless and fixed wireless in various frequency spectrums including visible light, radio frequency or RF, and other wavelengths of electromagnetic radiation, among others, and combinations thereof).

In addition, as a result of various cost structures for transmission systems and network architectures for allocating individual bandwidth to a user or shared bandwidth to a group of users, the bandwidth available to deliver content to each consumer's end terminal often varies. End-user network terminals can playback, display, or produce content in a form consumable by end users through human senses. Common end-user terminals for accessing networks include, for example, personal computers, telephones, televisions, cell phones, stereos, and radios, among others. Further, different end-user terminals are capable of differing levels of content playback fidelity and quality such as the difference between a low-quality compressed voice telephone call and a CD-quality stereo audio or between a 3-inch cell phone video display and a 60+-inch wide-screen TV display. While most end user terminal devices produce output for the human senses of sight and hearing, other types of more specialized terminals produce output for other senses such as but not limited to touch in a refreshable Braille display. Thus, although the common examples described herein will primarily relate to telecommunication of signals of text, audio, and visual data ultimately delivered to the sight and/or sound senses of humans, the signals can also carry information for any other sensory perception.

In addition, end-user terminals have different levels of processing and computing capability to implement processing of received content. For instance, a desktop computer connected to AC electrical power outlet normally has a processor with more computing ability than a cell phone operating off a light-weight rechargeable battery. Thus, a desktop computer generally has more capability to perform additional post-processing after reception of content than would a cell phone.

With so many variations in the capabilities of end-user terminals and in the bandwidth limitations and characteristics of access networks, broadcast or multicast transmission of content often can be more efficient when the source content is converted into one or more appropriate stream formats before transmission to end-user terminals. Then the end-user terminals each receive content that generally is optimized for the terminals' capabilities (usually including but not limited to screen size, audio output, processing speed, etc.). Furthermore, broadcast or multicast content generally is distributed to a multitude of end-terminals, each of which may have different capabilities, but which might be partitioned into groups of end terminals with similar capabilities (e.g., smart cell phones communicating to a 3G cell tower in contrast to large screen TVs with digital CATV service connected to the same headend.)

Broadcasting source content to many different recipient end-terminals with groupings of quality performance and network access bandwidth often can be accomplished more efficiently by converting the source content to multiple output format encodings each one intended to support a singular terminal type or groups of generally similar end terminal devices. Converting a source content format to an alternative output content format is generally known as transcoding. In addition, converting broadcast or multicast content to support heterogeneous individual or groupings of end terminals by transcoding often can be done more efficiently at a centralized location with additional processing power (and with AC or DC line power instead of the energy restrictions of a portable cell phone battery) rather than implementing computational algorithms to convert media content in the end user terminals receiving the media content. However, even centralizing the transcoding computations and operations can be improved to use processing, memory, and hardware resources more efficiently to support the largest number of transcoded streams for the least costs in terms of processing, memory, hardware, power, etc. Thus, there is a need for greater efficiency in systems and methods used to transcode source content signals into one or more output format signals in a way that reduces equipment costs and/or increases transcoding capacity.

BRIEF DESCRIPTION OF THE DRAWINGS

Like reference numbers and designations in the various drawings indicate like elements.

DETAILED DESCRIPTION

Example implementations, including systems and methods, can operate to transcode source content signals from one format to one or more additional formats. Moreover, the transcoded output signals can, but are not required to, carry information related to the same sensory human perception as the original signal. Thus, an audio input signal of words might be transcoded to a different format audio signal and to a text or image output signal for the deaf. Moreover, a composite group of signals such as an MPEG2 transport stream including audio programming and video programming may only perform transcoding of the relatively more bandwidth-demanding video streams to compress the video and reduce bandwidth requirements while passing the relatively less bandwidth-intensive audio streams unmodified.

Figure 1:
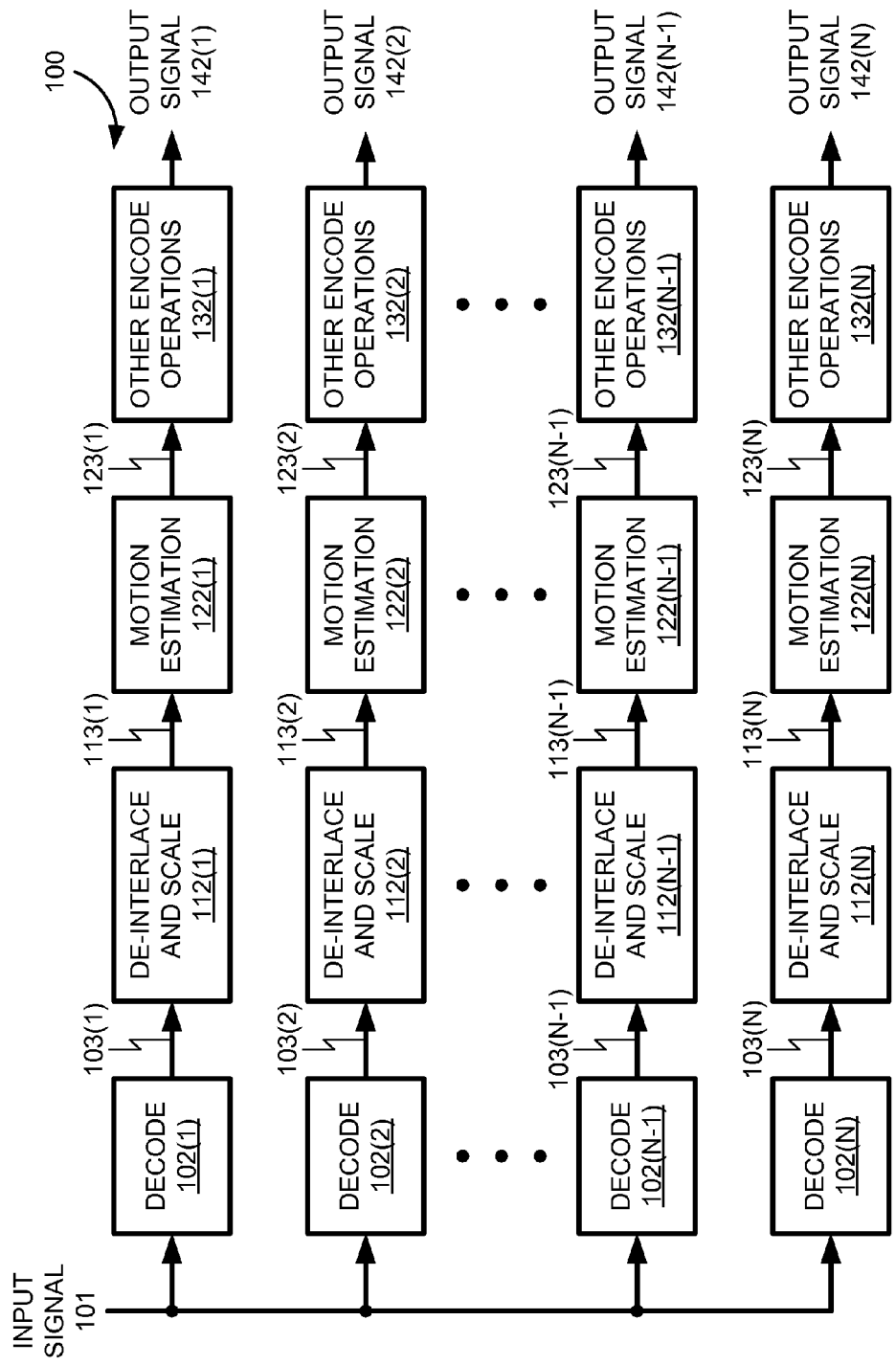
FIG. 1 is a block diagram of a transcoding system for converting a source input signal to multiple output signals.

FIG. 1 is a block diagram illustrating an example system 100 used to transcode an input information signal 101 into a plurality of outputs from 1 to N. As shown in FIG. 1, the input signal 101 is decoded N times in decoders 102(1), 102(2), . . . , 102(N−1), and 102(N). Decoders 102(1)-102(N) generate outputs 103(1), 103(2), . . . , 103(N−1), and 103(N) respectively, which are respectively fed into de-interlace and scale modules 112(1), 112(2), . . . , 112(N−1), and 112(N). De-interlace and scale modules 112(1)-112(N) generally use a de-interlacer to convert an image from an interlaced version to a non-interlaced version. Then the modules 112(1)-112(N) scale the image to appropriate output resolutions.

While FIG. 1 shows de-interlace and scale modules 112 (1)-112(N), one skilled in the art will realize that the de-interlace operation and the scale operation also may be implemented in separate modules. In addition, de-interlacing and scaling are each optional depending at least on the format of the input signal 101 and the formats of the output signals. Typically, interlaced video uses one frame of even video scan lines and one frame of odd video scan lines to reduce the bandwidth demands associated with providing image updates (e.g., a picture of half resolution is provided every one-sixtieth of a second). However, other interlacing techniques such as three frames of every third line, four frames of every fourth line, etc. are possible, and the concepts herein are not limited to particular interlacing techniques.

The scaling performed on the images in the modules 112 (1)-112(N) generally converts the input signal to different potentially temporal and/or spatial resolutions being produced by each of the modules 112(1)-112(N). An example of spatial resolution scaling would be converting an HD input video to an SD output video. An example of temporal resolution scaling would be converting a 30 frames per second video to a 15 frames per second video to be displayed on a mobile device. Combination of spatial and temporal resolution changes can be performed in the scaling module where a 1080i HD video is converted to a 720p HD video which involves changing both temporal and spatial resolutions. In addition, system 100 is capable of being configured to pass images through without any spatial or temporal scaling, but with a change in the compression codec algorithm from system 100 input to output.

After the image is optionally de-interlaced and optionally scaled in blocks 112(1)-112(N), the outputs 113(1)-113(N) are fed into motion estimation blocks 122(1)-122(N), which estimate motion of image objects and graphical picture elements over one or more successive frames at each output resolution. In general, motion estimation involves determining the change in objects or image areas from one image to the next. Then information on the changes in these objects or images can be encoded and transmitted in a communication system or through a recorded medium to reduce the amount of transmitted data or the data size on the recorded medium. At least some of the MPEG encoding schemes support forward and/or backward motion estimation between a frame and previous frames or future frames respectively. Then the transmitter (or recorder) and receiver (or playback unit) often each run predictive probabilistic algorithms to estimate the motion of objects or image areas to reduce data communication size by transmitting updates, corrections, or errors to the predictive algorithms running on the receiving or playback device. The motion estimators 122(1)-122(N) generate outputs 123 (1)-123(N) respectively, which respectively form inputs into other encode operations blocks 132(1)-132(N).

The other encode operations blocks 132(1)-132(N) perform one or more activities such as, but not limited to, further motion estimation, macroblock coding mode estimation, quantizer selection, and bit rate control. The resulting output signals 142(1)-142(N) are transcoded versions of the input signal 101. The output signals 142(1)-142(N) may be encoded using different coder-decoder modules (codecs) than the input signal 101. Non-limiting examples include converting an input signal 101 encoded with an MPEG2 codec into one or more output signals 142(1)-142(N) encoded using MPEG4 codecs or converting an MPEG4 input into one or more MPEG2 outputs. Furthermore, one skilled in the art will realized that the input signal 101 and output signals 142(1)-142(N) may be encoded using any codec formats in addition to the examples of MPEG2 and MPEG audio and video codec formats described herein. One skilled in the art also will be aware that each of the input signal 101 and the output signals 142(1)-142(N) can be constant bit rate (CBR) or variable bit rate (VBR) in addition to any other description of the time-varying nature of the bit rate.

In general for system 100 of FIG. 1, decoder 102(1), de-interlacer and scaler 112(1), motion estimator 122(1), and other encode operations 132(1) generally comprise transcoder 1 of FIG. 1. In addition, decoder 102(2), de-interlacer and scaler 112(2), motion estimator 122(2), and other encode operations 132(2) generally comprise transcoder 2 of FIG. 1. Moreover, decoder 102(N−1), de-interlacer and scaler 112(N−1), motion estimator 122(N−1), and other encode operations 132(N−1) generally comprise transcoder N−1 of FIG. 1. Finally, decoder 102(N), de-interlacer and scaler 112 (N), motion estimator 122(N), and other encode operations 132(N) generally comprise transcoder N of FIG. 1.

Furthermore, although the concepts have been described generally using a video signal, these concepts also apply to other types of signals including, for example, among others, audio. As a non-limiting example, to more efficiently reduce output bandwidth usage, a system 100 as in FIG. 1 may process a combined transport stream of audio and video input signals 101 to selectively reduce the bandwidth required for video encoding while passing the relatively less bandwidth-intensive audio encoding as substantially unchanged in the output signals 142(1)-142(N).

While system 100 of FIG. 1 provides a capability to transcode an input signal 101 to a plurality of output signals 142(1)-142(N) with different characteristics than the input signal 101, such a system 100 configuration does not efficiently use hardware and/or software resources. In some implementations, a simplistic solution would be to employ a single set of logic block modules of decode 102, de-interlace and scale 112, motion 122, and other encode operations 132, and reuse the single set of logic block modules N times to generate output signals 142(1)-142(N). However, such a simplistic solution of reusing logic block modules typically either slows down processing (e.g., taking N times longer than the time taken to go through the 1 to N parallel logic block modules (102, 112, 122, and 132) of system 100) or otherwise requires logic block modules (102, 112, 122, and 132) to be designed as N times faster than a parallel implementation with N sets of logic block modules (102, 112, 122, and 132) as in system 100.

In a software implementation of the aforementioned simplistic solution, the single set of logic block modules of decode 102, de-interlace and scale 112, motion 122, and other encode operations 132 generally would be N times slower (as a rough approximation, ignoring complexities such as context shifts and other effects from mapping an operation from serial to parallel implementations) when serially executed on a single processor than on N processors of the same speed executing in parallel. Performing this simplistic solution on a single processor at the same rate generally would need a single processor that is N times faster (again, ignoring complexities) than each of N processors operating in parallel. Other similarly simplistic solutions might use: N/2 processors two times each serially for a processing time of 2 times the time taken for N same speed processors in parallel, N/3 processors three times each serially for a processing time of 3 times the time taken for N same speed processors in parallel, etc. (These rough time estimations make the simplistic assumption that the number of outputs 142(1)-142(N) map evenly onto N/2, N/3, etc. processors.)

Thus, simplistic reuse of logic block modules generally reduces processing performance, generally requires more expensive and faster logic block modules, or both. In general, the problem with the simplistic solution is that each set of computation paths generally is independent (or at least independent in one or more of the later stages) without some substantial cooperation to improve performance and/or reduce complexity between logic modules computing one of the outputs (such as but not limited to output signal 142(2)) and logic modules computing another one of the outputs (such as but not limited to output signal 142(N−1)). Instead of such a simplistic and inefficient solution, a better solution would be capable of transcoding an input signal 101 to multiple output signals 142(1)-142(N) at a high processing rate and with an efficient use of processing logic modules.

Figure 2:
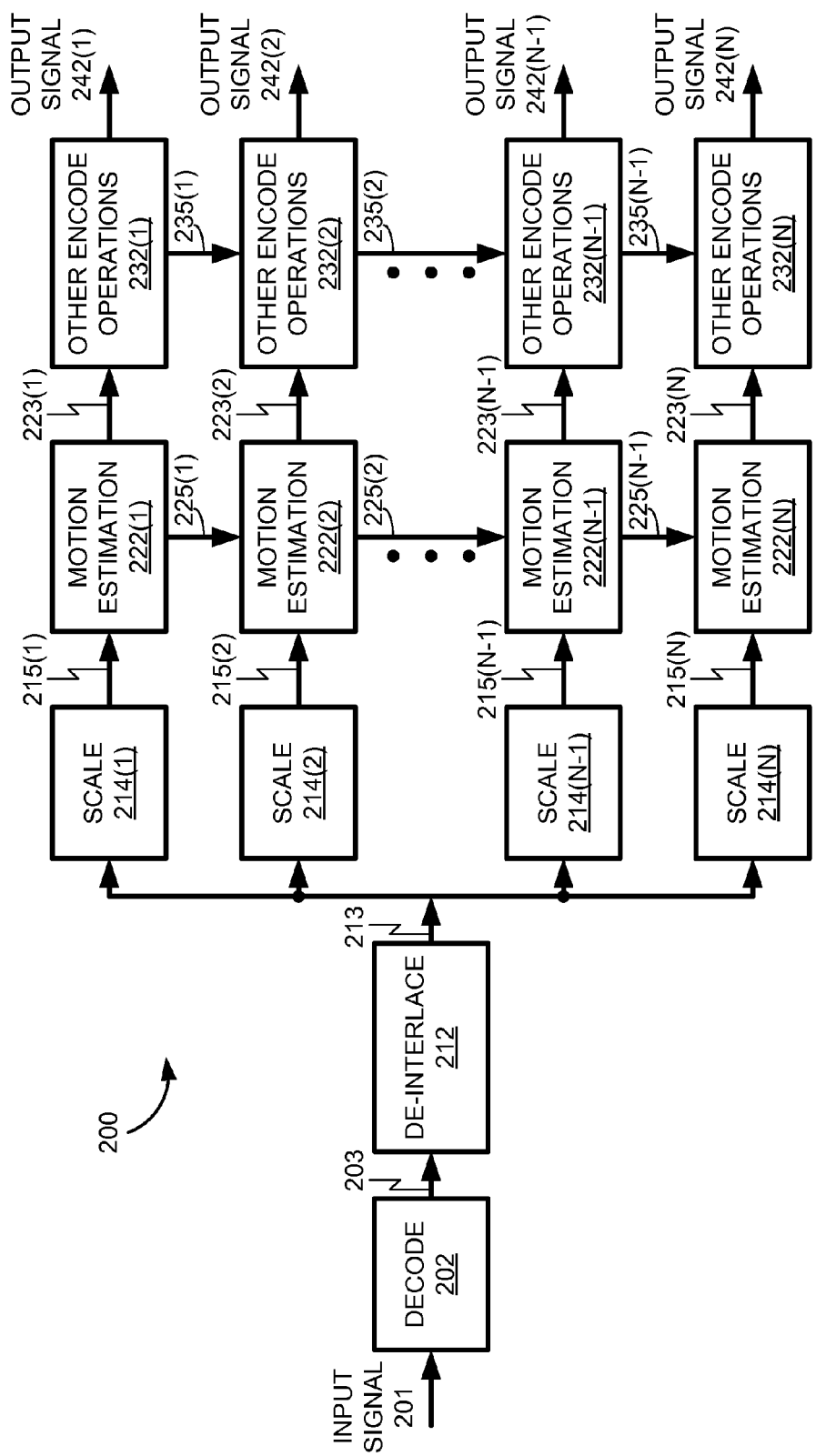
FIG. 2 is a block diagram of an example transcoding system used to convert a source input signal to multiple output signals in which related transcodings of source content are generated cooperatively.

FIG. 2 is a block diagram of an example transcoding system 200 used to convert a source input signal to multiple output signals in which related transcodings of source content are generated cooperatively. The transcoding system 200 can perform up to N transcodings of input signal 201 using fewer hardware modules and simpler hardware modules than the transcoding system 100 of FIG. 1. Another advantage of cooperative transcoding is that the multiple transcoded outputs are "consistent" with each other. Since the encoding decisions (such as scene changes, motion vectors, macro block coding modes, but not limited to) are shared between different transcoding modules, the transcoded outputs are consistent. In certain video streaming applications, the client (decoder) device can adaptively switch between one transcoded output and another. In such a scenario, cooperative transcoded outputs offer a uniform visual experience, thus improving the Quality of Experience (QoE) perceived by the end-user.

In FIG. 2, the input signal is decoded by a single decoder module 202, which provides input 203 to optional de-interlacer block 212, which de-interlaces interlaced frames (such as but not limited to frames of 1080i). However, it should be understood that, in various implementations, more than one decoder and/or de-interlacer can be used, though multiple hardware modules would be less efficient from a hardware standpoint. In other implementations, the decoder and de-interlacer functionality can be combined into a single hardware module.

After the input signal is decoded and optionally de-interlaced, the resulting decoded and optionally de-interlaced signal 213 can be scaled. The scaling for up to N versions of decoded/de-interlaced signal can be performed by scalers 214(1)-214(N). Although not shown in FIG. 2, in some implementations, the outputs of one or more of the scalers 214(1)-214(N) can be dependent upon not only the output of de-interlacer 212, but also the output of other scaler logic modules 214(1)-214(N). Thus, one scaler could be an exact and simple function of another scaler, thereby simplifying the logic of the secondary scalers by depending on the logic of another higher tier scaler. In addition, although not shown in FIG. 2, one skilled in the art will realize that a single scalar may provide input to multiple motion estimation modules. A non-limiting example might be a 1080p input signal that is converted to 720p for multiple outputs, but each of the multiple outputs may have different bit rates/frame and/or different frame rates/codec.

Scalers 214(1)-214(N) respectively generate outputs 215(1)-215(N), which are respectively input into motion estimators 222(1)-222(N). Like the transcoding system 100 of FIG. 1, the output 223(1)-223(N) of each motion estimator 222 depends upon the output of respective scalers 214(1)-214(N). However, unlike the transcoding system 100 of FIG. 1, the output of each motion estimator can also depend on one or more outputs 225(1)-225(N−1) of one or more other motion estimators 222, e.g., one or more higher-tier motion estimators. For example, FIG. 2 shows the output 223(N) of motion estimator 222(N) depends on input 215(N) from scaler 222(N) and input 225(N−1) from motion estimator 222(N−1). However, in some implementations, motion estimator 222(N) can also receive input directly from one or more other motion estimators 222(1) and 222(2) (although for diagram simplicity additional inputs to motion estimator 222(N) are not shown in FIG. 2).

As shown in FIG. 2, the output 225(1) of motion estimator 222(1) to motion estimator 222(2) is not necessarily the same as the output 223(1) from motion estimator 222(1) to other encode operations module 232(1), although the two outputs 225(1) and 223(1) could be the same. More generally, motion estimator 222(1) may compute one or more values that are related to the output 223(1) from motion estimator 222(1) to other encode operations module 232(1) and one or more values that are related to the output 225(1) from motion estimator 222(1) to motion estimator 222(2). By decomposing the computations for output 223(1) and the computations for output 225(1) in ways that commonality exists between computing partial values for 223(1) and 225(1), additional logic reductions can be obtained from sharing and/or reusing the computed partial values to generate the 223(1) and 225(1) outputs.

Motion estimators 222(1)-222(N) respectively output signals 223(1)-223(N), which are provided as input to other encode operation modules 232(1)-232(N). Other encode operation modules 232(1)-232(N) can perform functions such as but not limited to one or more of the following: macroblock coding mode decisions, bit rate control, entropy coding, and deblock filtering. Unlike the other encode operation modules 132(1)-132(N) of FIG. 1, in some implementations, the various other encode operation modules 232(1)-232(N) of FIG. 2 can receive input 223(1)-223(N) from the respective motion estimation block 222(1)-222(N) and can also receive input 235(1)-235(N−1) from one or more additional other encode operations modules 232. For example, as shown in FIG. 2, other encode operations module 232(N) receives input 223(N) from motion estimator 222(N) and input 235(N−1) from another other encode operations module 232(N−1). Although not shown in FIG. 2 for diagram simplicity reasons, in some implementations, other encode operations module 232(N) can also receive input directly from multiple other encode operations modules such as but not limited to other encode operations modules 232(1) and/or 232(2). As shown in FIG. 2, the outputs of other encode operations modules 232(1)-232(N) result in output signals 242(1)-242(N).

As shown in FIG. 2, the output 242(1) of other encode operations module 232(1) is not necessarily the same as the output 235(1) from other encode operations module 232(1) to other encode operations module 232(2), although the two outputs 242(1) and 235(1) could be the same. More generally, other encode operations module 232(1) may compute one or more values that are related to the output signal 242(1) and one or more values that are related to the output 235(1) from other encode operations module 232(1) to other encode operations module 232(2). By decomposing the computations for output 242(1) and the computations for output 235(1) in ways that commonality exists between computing partial values for 242(1) and 235(1), additional logic reductions can be obtained from sharing and/or reusing the computed partial values to generate the 242(1) and 235(1) outputs.

Like FIG. 1, the concepts in FIG. 2 can be applied to many types of information signals including but not limited to audio and video as well as combined signals containing one or more audio signals and one or more video signals. As a non-limiting example, to reduce output bandwidth usage, a system 200 as in FIG. 2 can process a combined transport stream of audio and video input signals 201 to selectively reduce the more bandwidth-intensive video encoding while leaving the less bandwidth-intensive audio encoding relatively unchanged in the output signals 242(1)-242(N).

The logic block modules 212, 214, 222, and 232 to perform de-interlacing, scaling, motion estimation, and other encode functions respectively in system 200 of FIG. 2 generally should need less logic software and/or hardware than logic blocks 112, 122, and 132 to perform de-interlacing, scaling, motion estimation, and other encode functions respectively in system 100 of FIG. 1 because the logic blocks (214, 222, and 232) in FIG. 2 can depend on cooperative help to generate at least partially computations from other logic blocks in system 200. As a non-limiting example, motion estimator 222(N) can depend at least upon computations of scaler 222(N) and motion estimator 222(N−1). In contrast, in FIG. 1 motion estimator 122(N) does not take advantage of any computed input from motion estimator 122(N−1). Thus, the logic blocks of FIG. 2 are likely to be simpler than the logic blocks of FIG. 1 because logic blocks (214, 222, and 232) in FIG. 2 can depend on computations from other logic blocks and not have to redo the calculations essentially from scratch as in FIG. 1.

In general for system 200 of FIG. 2, decoder 202, de-interlacer 212, scaler 214(1), motion estimator 222(1), and other encode operations 232(1) generally comprise transcoder 1 of FIG. 2. In addition, decoder 202, de-interlacer 212, scaler 214(2), motion estimator 222(2), and other encode operations 232(2) generally comprise transcoder 2 of FIG. 2. Moreover, decoder 202, de-interlacer 212, scaler 214(N−1), motion estimator 222(N−1), and other encode operations 232 (N−1) generally comprise transcoder N−1 of FIG. 2. Finally, decoder 202, de-interlacer 212, scaler 214(N), motion estimator 222(N), and other encode operations 232(N) generally comprise transcoder N of FIG. 2.

In a sense, the input to motion estimator 222(N) is a pipelined input from one or more of the other motion estimators 222(1)-222(N−1). As shown in FIG. 2, information is sequentially transmitted (and optionally further processed) from motion estimator 222(1) to motion estimator 222(2) through output/input 225(1), . . . , and eventually from motion estimator 222(N−1) to motion estimator 222(N) through output/input 225(N−1). However, more generally, any of the modules of a transcoder of FIG. 2 can exchange its computational information with one or more modules of other transcoder paths. As a non-limiting example, motion estimation module 222(1) in transcoder 1 of FIG. 2 can directly send its output to motion estimation module 222(N) in transcoder N of FIG. 2 without sequentially passing information through every intervening motion estimation module 222(2)-222(N−1).

Any of the devices, systems, logic blocks, or modules and components thereof, or software modules/programs described in this disclosure, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal can be an artificially generated signal, e.g., a machine generated electrical, optical, or electromagnetic signal that can be generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

Furthermore, one skilled in the art will realize that signal processing logic modules can be implemented in hardware, software on a general purpose processor, software on a digital signal processor (DSP), and combinations thereof. In addition, one skilled in the art will be aware that improvements in efficiency and/or reductions in logic using the subject matter and functional operations described in this specification can improve hardware circuitry implementations, software implementations, and/or combined implementations. Logic reduction decreases the logic elements in hardware and/or reduces the number of instructions that are executed in software. Logic reduction can be applied to reducing system cost, increasing system performance, or combinations of reduced costs and increased performance.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube), LCD (liquid crystal display), LED (light emitting diode) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what might be claimed, but rather as descriptions of features that might be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features might be described above as acting in certain combinations and even initially claimed as such, one or more features from a claimed combination can in some cases be excised from the combination, and the claimed combination might be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing might be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing might be advantageous.

What is claimed is:

1. A method of transcoding an input signal to a plurality of output signals by a transcoding system, the method comprising:
   receiving an input signal;
   scaling a signal associated with the input signal by a first scaling factor to generate a first scaled signal;
   scaling the signal associated with the input signal by a second scaling factor to generate a second scaled signal;
   computing a first partial value based on at least input of the first scaled signal, the first partial value being determined so as to provide a common computing value between an output to subsequent encode operations and to one or more lower tier motion estimators;
   determining a first tier motion estimate output based on at least the first partial value, wherein the first partial value represents one or more encoding functions associated with the first scaled signal; and
   determining a second tier motion estimate input based on at least the first partial value, where each successively lower tier among a plurality of tiers of motion estimators is operable to use a respective tier motion estimate input received from a higher tier motion estimator along with a respective tier scaled input to calculate a respective tier partial value to be used to generate a respective tier motion estimate output and a successively lower tier motion estimate input for providing to at least a next lower tier motion estimator.

2. The method of claim 1 further comprising the steps of:
   determining a second motion estimate output based on at least input of the second scaled signal and the second tier motion estimate input; wherein determining the second motion estimate output based on at least input of the second scaled signal and the second motion estimate input involves less computation than determining the second motion estimate output without consideration of the second motion estimate input.

3. The method of claim 2 wherein the step of determining a second motion estimate further comprising the steps of:
   computing a second partial value based on at least input of the second scaled signal and the second motion estimate input;
   determining a second motion estimate output based on at least the second partial value; and
   determining a third tier motion estimate input based on at least the second partial value.

4. The method of claim 2 further comprising the steps of:
   performing at least one other encode operation on the first motion estimate output to generate a first encoded signal; and
   performing at least one other encode operation on the second motion estimate output to generate a second encoded signal;
   wherein the other encode operation is at least one operation selected from motion refinement, macroblock coding mode selection, and bit rate control.

5. The method of claim 1 further comprising the steps of:
   decoding the input signal to generate a decoded input signal; and
   de-interlacing the decoded input signal to generate the signal associated with the input signal.

6. The method of claim 5 further comprising the steps of:
outputting a first output signal based at least upon the first encoded signal; and
outputting a second output signal based at least upon the first encoded signal and the second encoded signal.

7. The method of claim 6, wherein the input signal is a constant bit rate MPEG signal comprising at least one audio stream and at least one video stream.

8. The method of claim 6, wherein the first output signal is a variable rate MPEG signal.

9. The method of claim 6, wherein the second output signal is a variable rate MPEG signal.

10. A transcoding system for transcoding an input signal to a plurality of output signals, the system comprising:
first tier logic module configured to perform a first transcoding from the input signal to a first output signal;
second tier logic module configured to perform a second transcoding from the input signal to a second output signal; and
at least one interface between the first tier logic module and the second tier logic module, where each successively lower tier among a plurality of tiers of logic modules is operable to receive input from a higher tier logic module along with a respective tier scaled input to calculate a respective tier partial value to be used to generate a respective tier output and a successively lower tier logic module input for providing to at least a next lower tier logic module.

11. The system of claim 10 wherein the first tier logic module comprises at least a first scaler, a first motion estimator, and a first other encode operations module and wherein the second tier logic module comprises at least a second scaler, a second motion estimator, and a second other encode operations module.

12. The system of claim 11 wherein the second scaler receives information from the first scaler that reduces the computational complexity of the second scaler relative to the second scaler performing computations without the information from the first scaler.

13. The system of claim 11 wherein the second motion estimator receives information from the first motion estimator that reduces the computational complexity of the second motion estimator relative to the second motion estimator performing computations without the information from the first motion estimator.

14. The system of claim 11 wherein the second other encode operations module receives information from the first other encode operations module that reduces the computational complexity of the second other encode operations module relative to the second other encode operations module performing computations without the information from the first other encode operations module.

15. The system of claim 11 wherein the first other encode operations module is capable of performing at least one operation selected from first motion refinement, first macroblock coding mode selection, and first bit rate control; and
wherein the first other encode operations module is capable of performing at least one operation selected from first motion refinement, first macroblock coding mode selection, and first bit rate control.

* * * * *